May 23, 1933. M. L. FOX 1,909,943
SHOCK ABSORBER
Filed Jan. 31, 1931 2 Sheets-Sheet 1
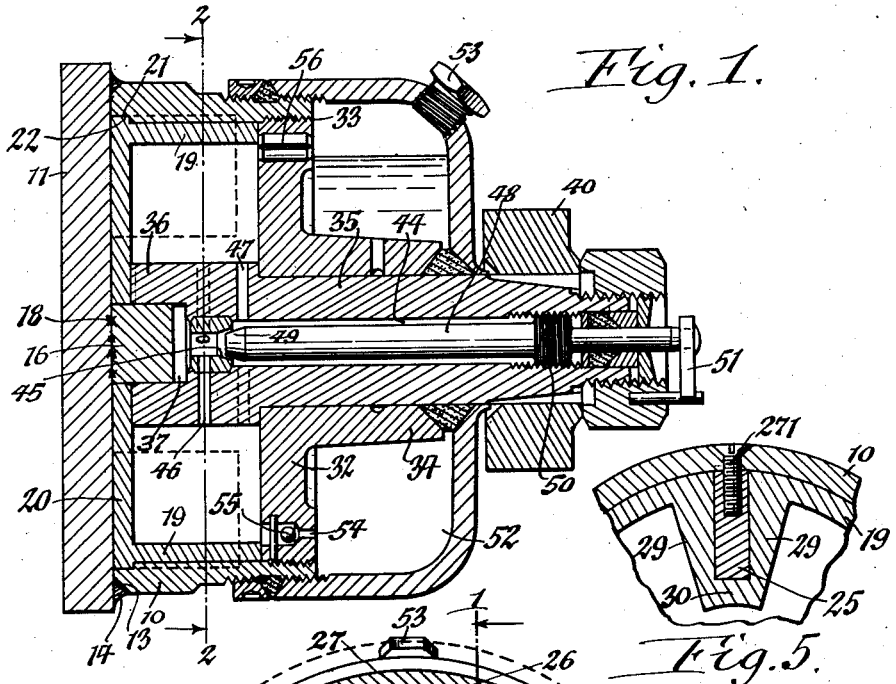
Fig. 1.
Fig. 5.
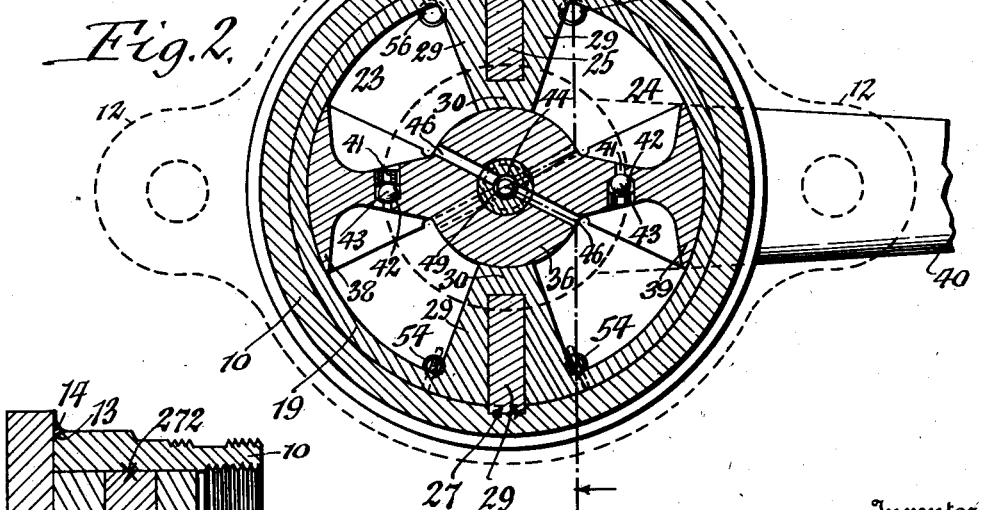
Fig. 2.
Fig. 6.
Inventor
Merritt L. Fox,
By Popp & Powers
Attorneys

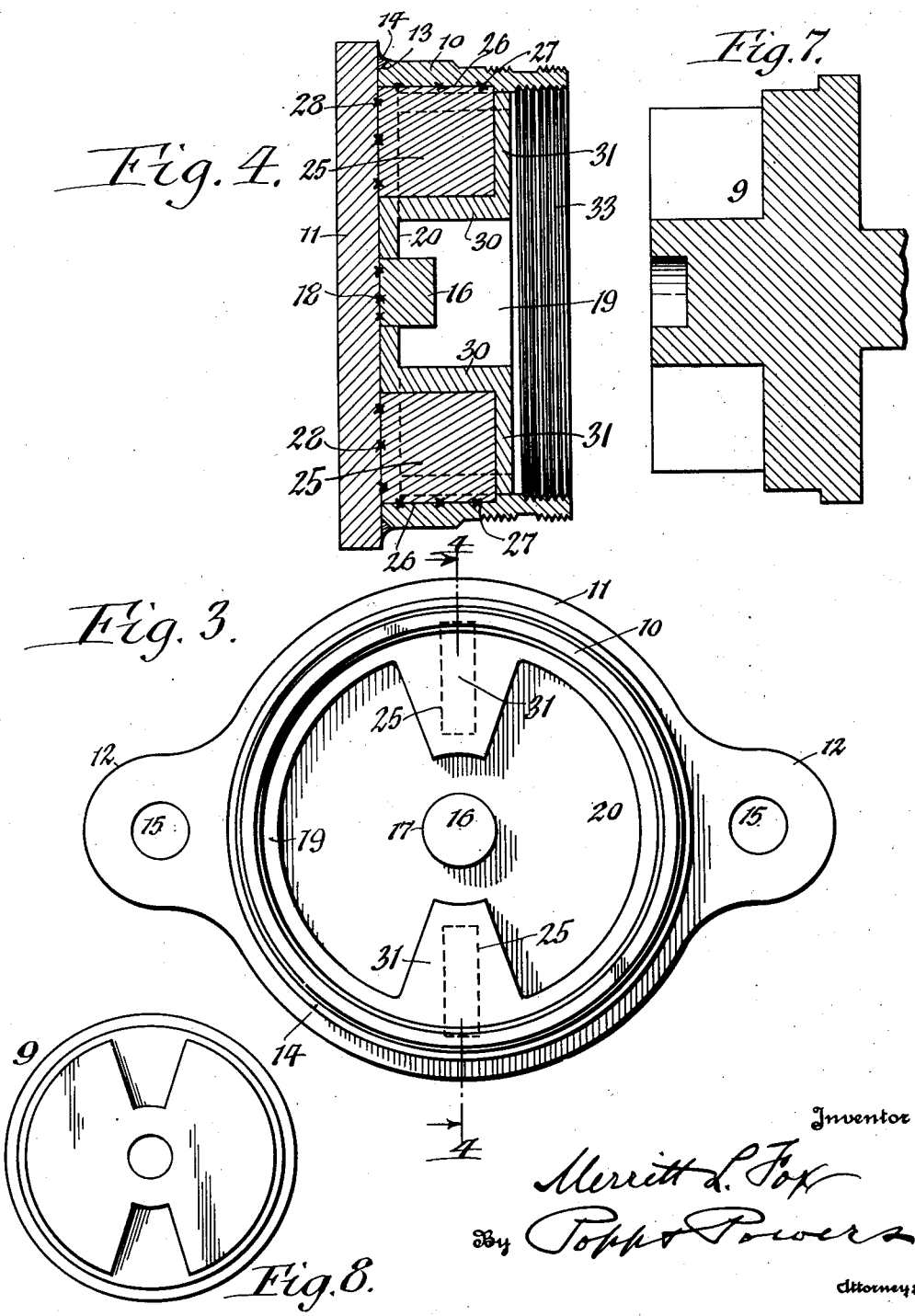

Patented May 23, 1933

1,909,943

UNITED STATES PATENT OFFICE

MERRITT L. FOX, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed January 31, 1931. Serial No. 512,600.

This invention relates to a hydraulic shock absorber and more particularly to the construction of and the method of making part of the walls of the working chambers containing the resistance liquid.

In hydraulic shock absorbers, such as the Houdaille type, the working space, sometimes called the operating chambers or reservoir, is usually made of forged steel and divided into two working chambers of compartments by two sections of a partition which are connected by a collar and form an integral unit, or these partition sections may be separate members and held in the proper position within the working space in various ways. This construction is expensive on account of the necessity of machining the working surfaces and the time required for doing this work.

It is the object of this invention to form the circular bore of the working chambers, the partitions between the same and an end wall thereof in one unit of molding material so that no machining of the working surfaces is required, thereby materially simplifying the construction and reducing the cost of manufacture.

In the accompanying drawings:

Figure 1 is a vertical longitudinal section of a shock absorber constructed in accordance with this invention and taken on line 1—1 Fig. 2.

Figure 2 is a vertical transverse section taken on line 2—2 Fig. 1.

Figure 3 is a front elevation of the body of the shock absorber with the detachable parts removed therefrom, which body is constructed in accordance with the present invention.

Figure 4 is a vertical longitudinal section taken on line 4—4 Fig. 3.

Figures 5 and 6 are fragmentary sections showing modified forms of cores for the partition sections of the molded lining.

Figure 7 is a sectional view of a die which can be used either as a molding die or as a chilling die in the process of manufacturing the shock absorber in accordance with this invention.

Figure 8 is a front view of the same on a reduced scale.

In the following description similar characters of reference indicate like parts in the several figures of the drawings:

In its general organization the particular shock absorber shown in the drawings, as an example of one suitable for use in connection with my invention, comprises a body which is adapted to receive the resistance liquid of the shock absorber, and means arranged within this body whereby the resistance liquid therein is displaced and caused to absorb the shock while the instrument is in use.

The body of the shock absorber comprises a cylindrical wall 10 which is preferably made by cutting off a piece of metal tubing of the desired length and diameter, and a flat plate of steel which has been cut into suitable shape by shearing or otherwise so as to form a rear head 11 for the rear end of the cylindrical wall 10 and two attaching lugs 12 which project from diametrically opposite ends of the head 11 and are adapted to be secured to one of the relatively movable parts—e. g. the body or frame of an automobile.

The rear end of the cylindrical wall 10 and the rear head 11 may be connected with each other in any suitable manner but this is preferably accomplished by welding, and as shown in Figs. 1 and 4, this is accomplished by bevelling the outer rear corner 13 of the cylindrical wall and electrically welding the rear end of the wall and the head to each other, and filling in the annular groove formed between the rear end of this wall and front side of the head 11 with a molten filler 14 of metal. The attaching lugs 12 are preferably provided with perforations 15 which are adapted to receive bolts whereby the same are attached to the body or frame of the car.

On the central part of the inner or front side of the head 11 is arranged a centering or pilot pin 16, the axis of which is concentric with the axis of the wall 10 and is utilized as means for centering the mold whereby my invention is applied to the body of the instrument, and also as a bearing for the piston means which oscillate in the working space within the cylindrical wall, and the means whereby this piston means is actuated. The periphery 17 of this centering or pilot pin is concentric with the bore of the wall 10 and this pin is preferably secured at its rear end to the inner or front side of the rear head 11 by welding, as shown at 18 in Figs. 1 and 4. Centering pins of this character can be cut off in suitable lengths from a rod of metal of the desired diameter.

By making the wall 10 of tubing, the rear head 11 and its attaching lugs from sheet metal, and the centering pin 16 from a rod, and connecting these members in the manner described by welding, the cost of the same is materially reduced as compared with the method heretofore used in which these several parts were made integrally of forged steel.

For the purposes of my invention the inner side or bore of the wall and the inner or front side of the head 11 are lined with a material which can be molded, preferably by the application of heat, so as to produce a perfectly finished cylindrical bearing surface on the inner side of this wall which is concentric with the periphery of the centering or pilot pin 16, and an accurately finished flat bearing surface is formed on the inner side of the rear head 11 without the necessity of machining the bore of the cylindrical wall on the inner side of the rear head for this purpose and still permit of properly engaging these lined surfaces by the pistons which move in the working space within the body which contains the resistance liquid.

This lining may be made of any suitable fusible liquid or plastic material which can be molded into shape against the surfaces which are to be lined and require no finishing to produce accurate surfaces for co-operation with other parts, but it is preferable to employ for this purpose a material which can be applied to the interior of the body in the form of powder and then fused by heat so as to convert this powder into a molten mass which becomes hard upon subsequently cooling, and practically forms an integral part of the body in which the same is molded.

It has been found satisfactory to use for this purpose condensite or bakelite or similar moldable, fusible or plastic material. In the finished condition of this lining the same forms an annular ring-shaped lining 19 on the inner side of the cylindrical wall 10 and a disk-shaped lining 20 on the inner or front side of the rear wall 11, which lining sections are integrally connected with each other and form one continuous piece. For the purpose of retaining this lining securely within the body, the bore of the wall 10 is provided at its rear end with an anchoring recess 21 having preferably the form of an annular groove or channel into which projects an annular anchoring flange or rim 22 whereby this lining is interlocked with the body and held against longitudinal displacement therein. This locking flange is formed integrally with the lining sections 19 and 20 and formed simultaneously therewith upon molding the lining on the interior of the body.

The cylindrical wall forms part of the housing enclosing the working space which receives the resistance liquid and the pistons, whereby this liquid is displaced for shock absorbing purposes.

In the preferred form of shock absorber which is shown in the drawings this working space is divided into two working chambers 23, 24 by means which include two partitions arranged diametrically opposite each other and preferably above and below the axis of the body. In the preferred construction these partitions are made partly of metal which is connected with the body, and partly of moldable material of the same character which constitutes the lining sections 19 and 20, and formed integrally with the latter. In the preferred construction each of these partition sections comprises a central core or lug 25 of metal having the form of a plate which has its opposite flat sides arranged lengthwise of the instrument and parallel with the radius of the same, and seated with its outer longitudinal edge in a longitudinal groove 26, as shown in Figs. 2 and 4, this core having its outer longitudinal edge and its rear transverse edge connected respectively with the circular wall and the rear head of the body by means of electric welding, as indicated at 27 and 28, so that in effect each of these partition cores forms an integral part of the body or a one-piece unit therewith.

Each of these cores 25 terminates at its front end short of the front end of the circumferential lining 19 and is covered on all of its surfaces, excepting those that are connected with the annular wall 10 and the rear head 11, by a moldable material of the same character as that utilized in the circumferential lining 19 and the disk lining 20 so as to form two longitudinal partition linings 29 on opposite longitudinal sides of the respective core 25, an inner partition lining 30 along the inner longitudinal edge of said core and a transverse partition lining 31 along the front end of said core, the front side of the last-mentioned lining 31 being flush with the front end of the circumferential lining 19, as shown in Figs. 1 and 4.

In the preferred process of producing this molded lining within the body of the shock absorber a quantity of powdered, liquid or plastic molding material is placed in the interior of the body and then a heated inner die or mold 9, shown in Figs. 7 and 8, is pressed into the body so as to form a mold cavity therein between the internal surfaces of the body and the external surfaces of this mold, which cavity conforms in contour to the exposed surfaces of the molded lining sections which are to be applied to the circumferential wall, the rear head, the centering pin and the partition cores of the metal body. As the inner mold is pressed into the interior of the body the same fuses or melts and spreads the molding material so that the latter completely fills the mold cavity and produces the linings on the wall, rear head and partition core heretofore described.

While this mold is in this position the molding material for the lining of the body is solidified and united with the body so as to practically become an integral part thereof. When using condensite or bakelite as the molded lining material the same is introduced into the body in the form of a powder. After this powdered molding material has been thus introduced, the same is subjected to the pressure of the previously heated inner mold or die and heated sufficiently high thereby to fuse it and convert the same into a solid integral mass. While this mass of lining material is still hot the molding die may be removed from the molded lining and replaced by a chilling die of the same size and shape as the molding die 9. This chilling die may be the same die 9 which is used for molding the interior of the lining but is of a lower temperature than when this die is used as a molding die and thereby operates to cool the lining material more rapidly and cause the latter to assume the exact shape which is desired by the time the lining material has become thoroughly set and hardened.

After this, the chilling die is removed, leaving the exposed surfaces of the lining sections on the circular wall, rear head, the centering pin, and the partition cores in the desired position so that they are in condition for assembly and operative relation with other parts of the shock absorber without requiring any machining of the interior of the body for this purpose other than the threading for assembling with other parts.

The cost of producing the respective part of the shock absorber is therefore materially reduced without sacrificing any wearing qualities or working requirements of the instrument.

If desired each of the cores 25 may be secured to the wall 10 by means of a screw 271, as shown in Fig. 5, and a pin-shaped core 251 may be secured at its outer end to the wall 10 by spot welding 272 for reinforcing the molded lining 301 of the respective partition section, as shown in Fig. 6.

Upon completion of the lining in the body in the manner described the same is assembled with the remaining parts of the shock absorber which are constructed and operated as follows:

The numeral 32 represents the front head of the working space of the body which is secured in the front part of the bore of the cylindrical wall 10 by means of a screw joint 33. This front head 32 engages its inner or rear side with the front edge of the cylindrical lining 19 and the front ends of the lining sections 31 which cover the front ends of the cores 25 of the partition sections, thereby preventing the passage of resistance liquid through these joints from one working chamber to another. Projecting forwardly from the central part of this front wall 32 is a tubular bearing 34 or sleeve in which is journaled an operating shaft 35 extending to the exterior of the instrument. The rear end of this operating shaft is connected with a hub 36, which latter engages its periphery with the opposing inner edges or faces of the longitudinal inner lining sections 30 of the partitions while its front end engages with the rear side or inner face of the metallic front head 32, and its rear end engages with the front or inner side of the molded disk lining 20. The rear end of the hub 36 is provided with a circular bearing recess 37 which receives the forwardly projecting centering or pilot pin 16, the axis of this pin and that of the bearing sleeve 34 being in line so that the shaft 35 and the hub 36 turn about the same axis. On its diametrically opposite sides the hub 36 is provided with two pistons 38, 39 which oscillate respectively in the working chambers 23 and 24 and cause the resistance liquid which is present in these chambers to be displaced therein and thereby absorb shock. Oscillation of these pistons is produced by means of an operating arm 40 secured at one end to the front end of the operating shaft, while the opposite end of this operating arm is connected with some part of the automobile which moves relatively to the frame or body, e. g. one of the axles which is connected by means of springs with the body or frame and carries a pair of the supporting wheels of the car.

Means are provided whereby during the low compression stroke of the pistons the resistance liquid is permitted to pass through each piston from the advancing to the trailing side of the same but during the high compression stroke of the same, the resistance liquid is prevented from passing through the pistons, thereby causing the instrument to absorb a greater amount of shock during the rebound of the body from the axle of the car than during the movement of the body toward the axle. This is accomplished in the present instance by means of a relief port 41 formed in each piston and provided with a valve seat 42 which is engaged by a check valve 43 for closing this port during the high pressure stroke of the respective piston, but to open the same during the low pressure stroke of the same.

Means are also provided for permitting a regulated quantity of the resistance liquid to pass from one end of each working chamber to the opposite ends of the same for the purpose of regulating the shock absorbing capacity of the instrument. In the present case this is accomplished by means of a valve chamber 44 formed lengthwise in the operating shaft and the hub of the piston, a valve seat 45 arranged in the rear part of the valve chamber, rear ports 46 leading through the hub from this valve chamber in rear of the seat 45 to the high pressure ends of the working chambers, front ports 47 leading through the hub from the valve chamber in front of the valve seat 45 to the low pressure ends of the working chambers, and a valve stem 48 arranged in the valve chamber and provided at its rear end with a valve 49 which is moved toward and from the valve seat 45 for regulating the amount of liquid passing from one end of each working chamber to the opposite end of the same working chamber and to the other working chamber.

This adjustment of the regulating valve is preferably effected by means of a screw joint 50 between the front part of the valve stem and the adjacent part of the operating shaft 35, and an adjusting arm 51 secured to the front end of the valve stem, externally of the operating shaft, and adapted to be shifted by hand.

Replenishment of the supply of resistance liquid to the working chambers is derived from a reservoir or replenishing chamber 52 which is connected with the front end of the cylindrical wall 10 and provided with a central opening through which the front end of the operating shaft 35 projects. This replenishing chamber is filled from time to time through an opening in its top which is normally closed by a plug 53, and resistance liquid passes from the lower ends of the same to one or both of the working chambers through replenishing ports 54 in the lower part of the front head 32, which ports are controlled by check valves 55 opening toward the working chambers but closing toward the replenishing chamber.

Air is permitted to escape from the upper ends of the working chambers through vent ports 56 formed in the upper part of the front head 32 and connecting the upper parts of the working chambers with the upper part of the replenishing chamber.

This manner of constructing the body and finishing the working surfaces thereof by means of molded material which becomes hard when set not only enables this part of the shock absorber to be manufactured easily and at reduced cost from standard metal tubing and plates but also avoids the necessity of any machine work incident to the use of forged bodies heretofore employed in the manufacture of shock absorbers.

I claim as my invention:

1. A shock absorber having a body comprising a circular wall having an undercut internal recess at its rear end, a head connected with the rear end of said wall, a circular lining of fusible material arranged on the inner side of said wall and forming a working surface therefor and having a lateral projection at its rear end engaging with said recess, and a piston arranged with said lining and moving in contact therewith.

2. A shock absorber having a body comprising a circular wall having an undercut internal recess at its rear end, a head connected with the rear end of said wall, a circular lining of fusible material arranged on the inner side of said wall and forming a working surface therefor and having a lateral projection at its rear end engaging with said recess, a disk lining of fusible material arranged on the inner side of said rear head and forming a working surface therefor, and a piston moving in contact with said circular and disk linings.

3. A shock absorber having a body comprising a circular wall and a rear head, a lining of fusible material having a circular part engaging the inner side of said wall and a disk part engaging the inner side of said head, and a piston moving in engagement with said circular and disk parts of said lining.

4. A shock absorber having a body comprising a circular wall and a rear head connected with the rear end of the wall and provided on its inner side with a centering pin, a front head connected with the front end of said wall and provided centrally with a bearing in line with said pin, a disk lining of fusible material engaging the inner side of said rear head and provided with a central opening which receives said pin, and a shaft turning in said bearing and on said pin and having a piston moving in contact with said lining.

5. A shock absorber having a body comprising a circular wall and rear head connected with the rear end of said wall, a partition core secured to the inner side of said head, a circular lining of fusible material engaging the inner side of said wall, a partition of fusible material enclosing said core and formed integrally with said circular lining, and a piston moving in contact with said circular lining.

6. A shock absorber having a body comprising a circular wall and rear head connected with the rear end of said wall, a partition core secured to the inner sides of said circular wall and said head, a circular lining of fusible material engaging with the inner side of said wall, a partition of fusible material enclosing said core and formed integrally with the circular lining, and a piston moving in contact with the inner side of said circular lining.

7. A shock absorber having a body comprising a circular wall and a rear head fixed on the rear end of said wall, a radial partition core secured at its peripheral edge to the inner side of said wall and at its rear end to the inner side of said rear wall, a circular lining of fusible material engaging the inner side of said wall, a disk lining of fusible material engaging the inner side of said rear wall, a partition of fusible material enclosing said core, said circular lining, disk lining, and partition being molded integrally and a piston moving in contact with said circular lining and disk lining.

8. A shock absorber having a body comprising a circular wall and a rear head fixed on the rear end of said wall, a radial partition core secured at its peripheral edge to the inner side of said wall and at its rear end to the inner side of said rear wall, a circular lining of fusible material engaging the inner side of said wall, a disk lining of fusible material engaging the inner side of said rear wall, a partition of fusible material enclosing said core, said circular lining, disk lining and partition being molded integrally and a piston moving in contact with said circular lining and disk lining, said wall being provided on its inner side with a recess which receives the adjacent edge of said core.

9. A shock absorber comprising a body having a peripheral wall and a rear head secured to the rear end of the wall, a molded lining having a peripheral section secured to the inner side of the peripheral wall and a disk lining section secured to the inner side of said rear head, a front head engaging the front edge of said peripheral lining section, a shaft journaled in said front head; and a piston connected with said front head, said disk lining and said peripheral lining.

10. A shock absorber comprising a body having a peripheral wall and a rear head secured to the rear end of the wall, a molded lining having a peripheral section secured to the inner side of the peripheral wall, a disk lining secured to the rear head and a partition section projecting forwardly from said disk lining and inwardly from said peripheral lining, a front head engaging with said peripheral lining and said partition lining, a shaft journaled in said front head, and a piston connected with said shaft and engaging with said peripheral lining, disk lining and front head.

In testimony whereof I, hereby affix my signature.

MERRITT L. FOX.